Figure 1:
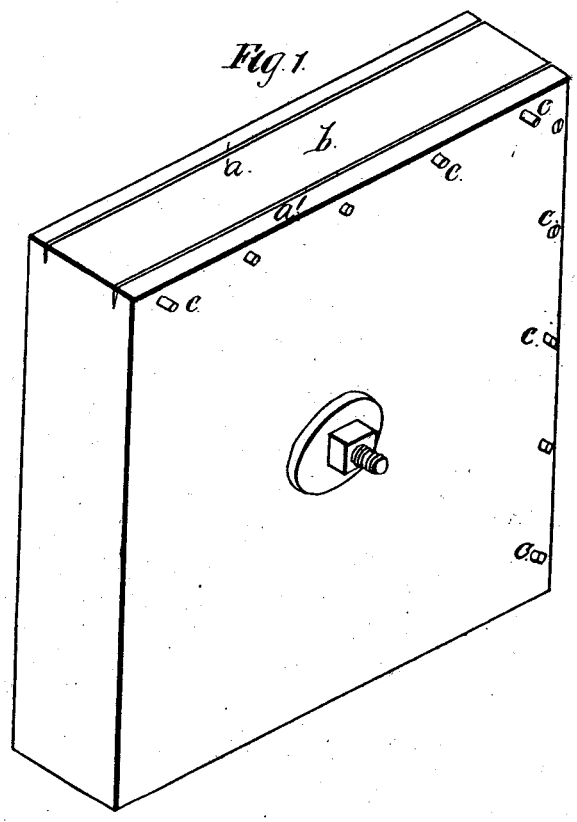

T. Prosser.
Grate.
Nº 10,450. Patented Jan. 24, 1854.

UNITED STATES PATENT OFFICE.

THOMAS PROSSER, OF NEW YORK, N. Y.

MANUFACTURE OF HOLLOW SLABS AND FLANGED METALLIC PLATES.

Specification of Letters Patent No. 10,450, dated January 24, 1854.

*To all whom it may concern:*

Be it known that I, THOMAS PROSSER, of the city, county, and State of New York, have invented a new and Improved Mode of Flanging and Double-Flanging Wrought-Iron Plates; and I do hereby declare that the following is a full and exact description.

The nature of my invention consists in the welding together of three pieces of iron, two of which are flat plates such as boilers are usually made of (although the omission of one of them may be desirable in some cases without materially altering the mode of operation,) and a ring or hoop which is placed between them. The ring or hoop should be somewhat less externally than the plates (or plate) so as to allow of the latter overlapping the former in the process of welding them together. The hoop may be welded up before it is placed between the plates or it may be made with a scarfed or other joint and being bent to the proper shape be slightly pinned together and welded in the after process which unites the whole. The plates with the hoop between them being placed together and properly clamped or bolted previous to being welded require that a number of holes should be made through each plate and into the hoop for the purpose of inserting guide or steady pins therein. The distance of these holes apart from each other is not important, but about ten times the thickness of the iron of which the hoops are made, appears from present experience to be a convenient distance.

With regard to the thickness of the manufacture which I shall denominate a "hollow slab" when the double flanging process is performed, *i. e.* when three pieces as before described are welded together, I have found that, to make a hollow slab by such means, of the thickness of three inches, with two plates of the thickness of one quarter of an inch each will require the iron of which the hoop should be made to be about two inches and three quarters of an inch in width and half an inch in thickness to make good sound work, but of course this will depend much upon the skill of the workman and also on the purpose for which the object is intended, which may require to be cut through and the flanges extended out by hammering or rolling or otherwise, and as the uses to which these hollow slabs are intended to be applied are very various and numerous withal, I may enumerate a few of them merely as examples.

The most simple and obvious application is to the purpose of water backs to fire places to heat water, for warming the air or for the purpose of supplying hot water to any part requiring it by the well known method of circulation through a pipe from the top re-entering at the bottom after it has performed the duty required of it. Next in simplicity is the application of these hollow slabs to sheet-water space boilers, drying closets, warming pans, fire proof chests communicating with a reservoir of water elevated above it or otherwise and circulating in the usual manner by heat.

Brewers and other attemperators, refrigerators and condensers, which for the most part may require many holes to be drilled for the purpose of inserting tubes therein while those previously enumerated will seldom require more than from two to four, to connect with each other and the source of safety—the water—say the "croton," for instance and the iron chest becomes a perfectly safe boiler so long as the supply of water continues and even afterward it is at least as good as any other safe. Less obvious is the application of these slabs to the making of such boilers as are known as "saddle boilers" often applied to warming hot houses and vats in various manufacturing manipulations. Continuing the idea of these saddle formed boilers I purpose making circular ones by continuing them until the two edges meet and giving them a tendency to close together in the manner of the free-joint tubes for which I obtained a patent in September last past No. 9278.

I would leave an aperture for the furnace door by bending the hoop into the proper shape either wholly or partially on one or other side of the free-joint. This furnace may be used as a safety against too great a pressure becoming generated, for although the tendency of it is to close and resist being opened with some force owing to the "set" which may be given it, that force may be overcome by a greater one tending to open it in the shape of water, air or steam within the incompleted annular space if under great pressure. For example, such a furnace being 16 inches in diameter within its water ring and 17 inches without the same and under a pressure of 50 lbs. to the square inch being 60 inches in height, there will be a force of some 1500 lbs. tending to open the furnace at the joint and thus let in the external air which will check the further accumulation of pressure. Of course all the pipes connected with such a furnace must be from neutral points or the joints will be liable to break unless some other provision is made to prevent it.

In some cases I purpose to make the slabs of a sufficient thickness to allow of being cut through at the mid thickness and thus form two flanged plates suitable for the heads of steam boilers particularly those of the locomotive kind as well as of a great variety of the smaller upright ones. For wheels of all kinds, particularly locomotive ones they will be found admirable as affording facilities for introducing cast-steel hoops or rings between the iron plates, to form the tread or sole of the wheel, which, after being turned in the lathe may be hardened at the wearing part while the two plates in addition to being strengthened at the hub may have screw bolts to fasten and unite each to the other or short pieces of tube expanded into the mid-thickness of each by means of tools which have already been patented by me for that purpose.

In the figure accompanying this specification and of which it forms a part I have shown one of my hollow slabs in two states of progression.

The figure represents the component parts of the hollow slab consisting of two plates $a$ and $a'$ with the hoop or band $b$ between them: It is in the unfinished state in which it will appear when about half welded up. The light part shows the steady pins $c$, $c$, and $c$ sticking out while the dark or shaded part is all plain and flat, the plates and hoop having been welded together and the pins too, so that there is no longer any appearance of separation or joint but all is one solid mass in external appearance.

The welding may be performed by hand, but I purpose to apply machinery consisting of rollers pressing toward each other with the slab between to perform the welding while another presses upon the edge to prevent spreading and give form and finish thereto. The slab according to its form may be heated at the part to be welded in a reverberating furnace either flat or upon its edge on a properly constructed carriage to bring it under the operation of the welding rollers.

Having now described the nature of my invention and the application thereof, I wish to observe, that, although I have used the term wrought iron, I mean to apply the same to all and any of the weldable metals particularly steel and platinum: that, I do not confine myself to any particular form or configuration by the term hoop or ring as that may mean annular, round, square, oval or any irregular form whatever.

What I claim as my invention and desire to secure by Letters Patent is—

1. The manufacture of hollow slabs when the same are made by welding together pieces of metal in the manner fully set forth and described or in any manner analogous thereto.

2. I also claim the manufacture of flanged metallic plates when the same are made by welding together pieces of metal in the manner fully set forth and described or in any manner analogous thereto.

THOS. PROSSER.

Witnesses:
ALLEN MOORE,
HENRY BEESON.